(No Model.)
T. BIERAU.
VELOCIPEDE.
No. 358,533. Patented Mar. 1, 1887.
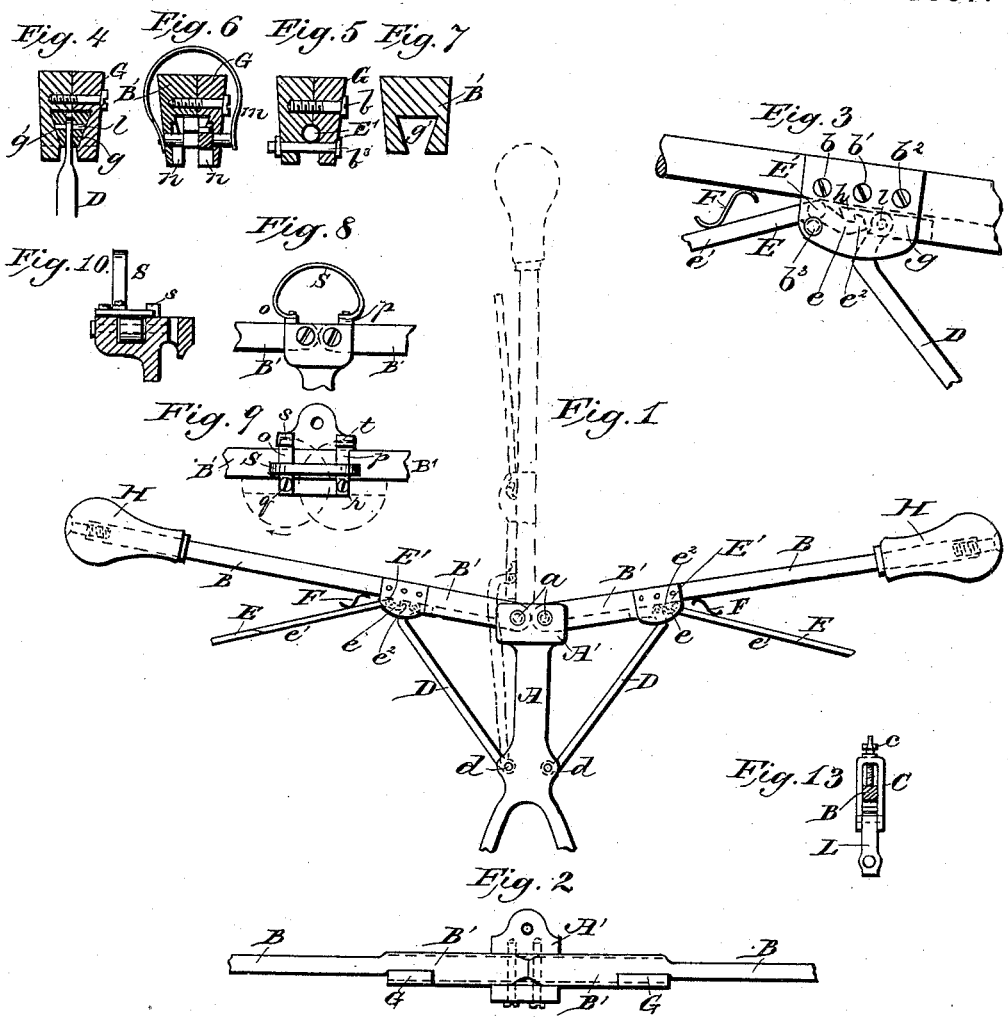

UNITED STATES PATENT OFFICE.

THEODOR BIERAU, OF ROTHAU, LOWER ALSACE, GERMANY.

VELOCIPEDE.

SPECIFICATION forming part of Letters Patent No. 358,533, dated March 1, 1887.

Application filed June 17, 1885. Serial No. 168,985. (No model.) Patented in Belgium May 21, 1885, No. 68,953; in France May 21, 1885, No. 169,081; in England May 21, 1885, No. 6,245; in Germany May 22, 1885, No. 33,670, and May 11, 1886, No. 37,805; in Italy June 12, 1885, XXXVI, 280; in Austria-Hungary November 18, 1885, No. 19,282 and No. 58,893, and in Denmark May 18, 1886, No. 292.

*To all whom it may concern:*

Be it known that I, THEODOR BIERAU, a subject of the German Emperor, residing at Rothau, Lower Alsace, German Empire, have invented certain new and useful Improvements in Velocipedes, (for which Letters Patent have been obtained in Belgium, No. 68,953, dated May 21, 1885; in Denmark, No. 292, dated May 18, 1886; in Germany, No. 33,670, dated May 22, 1885, and No. 37,805, dated May 11, 1886; in France, No. 169,081, dated May 21, 1885; in Great Britain, No. 6,245, dated May 21, 1885; in Italy, No. 280, dated June 12, 1885, and in Austria-Hungary, No. 19,282 and No. 58,893, dated November 18, 1885;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of bicycles in which the main driving-wheel performs the function of steering-wheel, and is combined with a trailing wheel to protect the rider against a backward fall from his vehicle. In this class of vehicles the rider is protected against backward fall by the trailing wheel; but there are no provisions made that will enable the rider to use his legs when the large driving-wheel runs against an obstruction and the rider is, by the sudden momentary stoppage of the vehicle, violently thrown forward. In bicycles of this class, when the large driving-wheel meets with an obstruction, especially when the vehicle is driven at a considerable speed, the sudden check to its momentum will cause the frame in which the trailing wheel is mounted and on which the rider is seated to be rotated on the axis of the main driving-wheel in the direction of motion. The rider will be violently thrown forward, and the cross-bar or steering-handles preventing any exertion he may make to land on his feet, as said bar or handles will follow his forward movement, he is thus almost invariably thrown on his head.

The object of this invention is to provide means whereby the rider may be enabled to throw his legs forward the moment the impact of the wheel with the obstruction takes place, and enable him to land on his feet instead of landing on his head. This I accomplish by providing means whereby the steering-handles will be automatically moved into a plane coinciding with the direction of motion of the vehicle, or with the direction in which the rider is propelled by the momentum of his vehicle when suddenly stopped, or whereby the cross-bar or steering-handles will be automatically detached from the steering-head by the pressure of the thighs or body of the rider thereon.

The invention consists, essentially and broadly, in the means whereby the above-described results are obtained, substantially as hereinafter described, and specifically pointed out in the claims.

In the accompanying drawings, Figure 1 shows in elevation so much of the steering-fork of a vehicle of the class referred to as will be necessary to illustrate my invention. Fig. 2 is a top plan view thereof. Fig. 3 is a detached detail view, on a larger scale, of a portion of one of the steering-handles. Figs. 4, 5, 6, and 7 are sections of different portions of one of the steering-handles. Figs. 8, 9, and 10 are an elevation, a plan view, and a section of the upper portion of the steering-fork and part of the steering-handles, showing means for locking the latter rigidly in position when the safety devices are not used. Fig. 11 is an elevation, and Fig. 12 a plan view, of a portion of a steering-fork, showing devices whereby the steering-handles are automatically detached from the steering-fork when the rider is thrown forward; and Fig. 13 is a section of one of the steering-handles on line 1 2 of Fig. 11.

In the above drawings, referring more particularly to Figs. 1 to 10, A indicates the steering-fork, and A' the head thereof, in which latter are pivoted the arms of the cross-bar or the steering-handles B (which are here composed of two parts) by means of bolts or pivots *a a*. A portion, B', of the handles B, extending outward from the head A' of the fork A, is rectangular in cross-section, while the remaining portion of said handles is round or cylindrical in cross-section, and they carry at their outer ends the usual hand-holds, H H. To the fork A, on opposite sides and at a suitable distance from its head A', is pivoted one end of the brace-rods D D by means of bolts or pivots $d$ $d$, the opposite end of said rods being pivoted by means of bolts $l$ to blocks $g$, having the form of a truncated cone in cross-section, or other suitable form, which blocks slide in correspondingly-shaped grooves $g'$, formed in the under side of the rectangular portion B' of the cross-bars or handles B, said grooves extending outwardly from the head A' of the steering-fork. Near its outer end the rectangular portion of the steering-handles is cut away to receive a plate, G, secured in place by bolts or screws $b$ $b'$ $b^2$ $b^3$, Fig. 3, at which point the groove $g'$ is formed partly by plate G and partly by the handle, as shown in Figs. 4 and 6. The forward end of the slide-block $g$ has a hook or catch, $h$, with which engages a corresponding hook, $e^2$, formed on one arm, $e$, of an angular two-armed detent-lever, E, pivoted in the groove $g'$ between plate G and the handle. A spring, F, holds the latch or hook $e$ of the detent-lever in engagement with the hook or catch $h$ on the sliding block. The arm $e'$ of lever E, as shown, extends outwardly toward the hand-holds H and rearwardly a suitable distance from the handles B, in proximity to the thighs of the rider.

By means of described arrangement of the retaining devices E $g$ D the cross-bars or steering-handles are rigidly secured or held in a plane at right angles to that of the longitudinal or vertical axis of the steering-fork A, to enable the rider to properly guide his vehicle. Should the driving-wheel run against an obstruction and the steering-fork and rider be thrown forward, the thighs of the latter will press against the arms $e'$ of the detent-levers and disengage the hooks or catches thereof from the slide-blocks $g$, so that in his forward movement the thighs of the rider will carry the handles forward also, and as the latter are now free to swing on their pivots $a$ said handles will thereby be moved into the plane of the longitudinal or vertical axis of the steering-fork and out of the way of the legs of the rider, who is thus enabled to make the necessary exertion to land on his feet. One of the handles B is shown by dotted lines in Fig. 1 in this last-described position.

Inasmuch as the forward movement of the rider when thrown is not always on a line coinciding with the direction of motion, so that the pressure on lever E may either be an upward or a lateral one, and to provide means whereby the disengaging of the levers E will be effected under any circumstances, I connect the same with the steering-handles B by means of a ball-and-socket joint, E', the socket being formed partly in plate G, partly in the handle B, as shown in Fig. 5, and I cut away a portion of the inner lower edge of the plate and handle to widen the groove or slot, as at $n$ $n$, Fig. 6, to permit a certain amount of lateral movement to the levers E. The bolt $b^3$ not only serves as a means to connect the plate G to the handle B, but also as a bearing upon which the ball E' of the detent-levers E rests. A spring, $m$, tends to keep the hook $e$ always in proper position.

If the above-described safety devices are not in use, the catches or latches $o$ and $p$ may be employed. These catches are pivoted to pins or bolts $q$ and $r$ and engage with lugs or hooks $s$ and $t$, Figs. 8, 9, and 10, to lock the handles B rigidly to the bar A. A spring, S, presses the latches outward against the handles, which latter may, however, be readily disengaged by moving the catches back again.

In Figs. 11, 12, and 13 I have shown a modification of the means by which the rider's legs are not impeded by the cross-handles. In this case the arrangement is such that when the rider is thrown forward the cross handles or bars B are detached from the steering-fork. The head A' of the fork A is made tapering and rectangular in cross-section. The steering-bar B has a corresponding opening or eye, B², so that it may be snugly fitted on the head of the fork. The fork is provided with laterally-projecting studs $u$, having shoulders $u'$. To the steering-bars are secured plates G, and to these are connected by ball-and-socket joint the detent-levers E, the arms $e'$ of which project rearwardly in proximity to the thighs of the rider. C C are yokes or stirrups loosely mounted on the steering-bar and held thereon by plate-spring S', the bent end of which is secured in a recess formed in a bracket, K, while the free end of the lower leaf or arm of the spring may simply bear upon the steering-bar; or it may be provided with a fork and embrace the stirrup. The free end of the upper leaf or arm of the spring S' bears on the under side of a shoulder formed on the upper end of the stirrup; or said free end may also be provided with a fork and embrace the upper end of the stirrup below the said shoulder. By means of set-screws $c$ $c$ the tension of said springs is regulated, said set-screws working in the upper end of the stirrups C and bearing upon the cross-bar B, as shown in Fig. 13.

To the lower end of the stirrups C are pivoted links L, provided with recesses for the reception of the ends of the studs $u$, and with springs $l$, that exert their power on the shoulder $u'$ of said studs and tend to disengage the links L therefrom. The arm $e$ of levers E in this case is devoid of a hook, and is of such length as to bear against the outer face of the links L at or near the point where these engage the studs $u$, and are forced against the links by the springs F to hold said links in engagement with the lugs against the stress of the springs $l$.

It is obvious that should the rider be thrown forward his thighs will bear upon the arms $e'$ of the detent-levers E, whose arms $e$ will move away from the links L and enable the springs $l$ to throw said links out of engagement with the lugs, and thereby disconnect the cross-bar B and permit it to become disengaged from the fork A.

The details of the construction of the devices for effecting the purposes in view may be varied without departing from the nature of my invention, and I do not wish to limit myself thereto.

I do not desire to claim herein certain features of construction shown, described, and claimed in my application for patent, Serial No. 204,631, filed June 9, 1886.

What I claim is—

1. The combination, with the steering-yoke of a velocipede and the steering-bars loosely connected therewith, of the hooked block $g$, arranged to slide in the said bars, the connecting-rods D, pivoted to said yoke and to the blocks $g$, and the pivoted hooked levers E, operating to engage the blocks and lock them against movement in the bars, as described, for the purpose specified.

2. The combination, with the steering-bars B B' and the levers E, connected thereto by ball-and-socket joint E', of the pin $b^3$, substantially as and for the purposes specified.

3. The combination, with the steering-fork of a velocipede and the steering-bars loosely connected thereto, of the lugs $s$ and $t$ and the spring S, substantially as and for the purposes specified.

In testimony whereof I affix my signature in presence of two witnesses.

THEODOR BIERAU.

Witnesses:
J. ENGLERT,
FZ. MULLER.